United States Patent [19]

Kwolek et al.

[11] 4,050,620
[45] Sept. 27, 1977

[54] METHOD OF WELDING A FRICTION MATERIAL TO A REINFORCING MEMBER

[75] Inventors: John P. Kwolek; William G. Urso; Trevor D. Jones, all of Latham, N.Y.

[73] Assignee: The Bendix Corporation, South Bend, Ind.

[21] Appl. No.: 683,460

[22] Filed: May 4, 1976

[51] Int. Cl.² .............................................. B23K 19/00
[52] U.S. Cl. .................................... 228/162; 228/243
[58] Field of Search ............. 228/24, 122, 124, 141 A, 228/162, 243

[56] References Cited

U.S. PATENT DOCUMENTS 3,528,166   9/1970   Portal et al. ..................... 228/243 X
3,639,974   2/1972   Finnegan ......................... 228/243 X Primary Examiner—James L. Jones, Jr.
Assistant Examiner—James G. Smith
Attorney, Agent, or Firm—Leo H. McCormick, Jr.; Ken C. Decker

[57] ABSTRACT

A method of making a brake friction pad which includes the steps of placing a sintered friction material into a retainer cup, heating the friction material and the retainer cup to a predetermined temperature in an inert atmosphere, and striking the friction material with a single blow of a predetermined force. This single blow increases the density of the friction material and establishes a metallurgical bond between the friction material and the retainer cup.

6 Claims, 2 Drawing Figures

METHOD OF WELDING A FRICTION MATERIAL TO A REINFORCING MEMBER

BACKGROUND OF THE INVENTION

This invention relates to a method of welding a friction material to a retainer to produce a friction member.

In the past, friction material has been attached to a retainer by either a mechanical or brazing bond. A typical mechanical bond is disclosed in U.S. Pat. No. 2,784,105 where the sintered friction material is held in a retainer cup by crimping the sides of the cup against the friction material. Unfortunately, under certain load circumstances, it is possible to separate the friction material from the retainer cup. In an attempt to increase the bonding strength between the friction material and the retainer cup, a screen was welded to the bottom of the cup. When the friction material, in powder form, was placed on top of the screen and a compressive force applied to compact the powder into the desired shape, the powder passed through the holes in the screen and formed a matrix. The matrix locked the friction material to the retainer cup. The friction material and retainer cup were then placed in an oven to sinter the friction material. Upon removal from the oven, the sides of the cup are crimped to further strengthen the retaining bond. Unfortunately, in this process, the oven size needs to be large enough to hold both the friction material and the retaining cup.

Typical examples of brazing bonds are disclosed in U.S. Pat. Nos. 3,528,807 and 3,761,256. In such brazing bonds, a material is located between a preformed friction material and the bottom of a retainer cup. When the friction material and retainer cup are placed in a sintering oven, the brazing material alloys with the friction material and the retainer cup to provide a bond which holds the friction material and retainer together. Unfortunately, because of the cost of the brazing material and the thermal energy required to heat the oven during sintering, friction materials utilizing brazing bonds have limited customer acceptance.

SUMMARY OF THE INVENTION

We have devised a method of manufacturing a friction member in which friction material is metallurgically welded to a retainer cup without using a brazing material. In our method, a friction composition in powder form is densified in a mold and then sintered in a furnace. The sintered friction composition is removed from the furnace and placed in a retaining cup to form a friction pad assembly. The friction pad assembly is heated rapidly to a predetermined temperature in an inert atmosphere. When the predetermined temperature is achieved, the friction pad assembly is placed in a forge and is struck with a single compressive blow to compact the friction material to a predetermined density. The predetermined temperature in conjuncton with the compressive force causes a weld to occur along the interface between the friction material and the retainer cup.

It is the object of this invention to provide a method of producing a metallurgical bond along the interface of a sintered friction material and a retainer.

It is another object of this invention to provide a method of welding a friction material to a retainer by striking the friction material with a single compressive force to compact the friction material to a specific density.

It is a further object of this invention to provide a method of individually sintering a friction material in an oven and thereafter metallurgically bonding the sintered friction material to a retainer by striking the friction material and retainer with a single compressive force.

These and other objects of this invention will become apparent from reading this specification and viewing the drawings.

DETAILED DESCRIPTION

Figure 1:
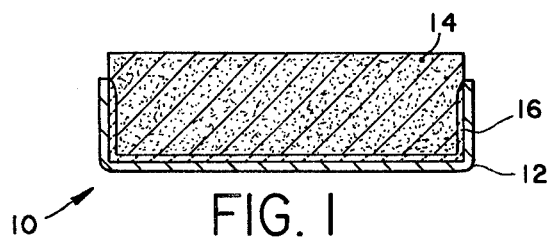
FIG. 1 is a sectional view of a friction member made in accordance with the principles of this invention.

The friction member 10, shown in FIG. 1 has a metallic reinforcing cup 12 metallurgically bonded to a copper or iron base friction material 14 by weld 16. The weld 16 extends substantially along the entire interface between the friction material 14 and the reinforcing cup 12. The reinforcing cup 12 provides strength to prevent chipping and crumbling of the edges of the friction material caused by tangential forces developed during a friction engagement.

Figure 2:
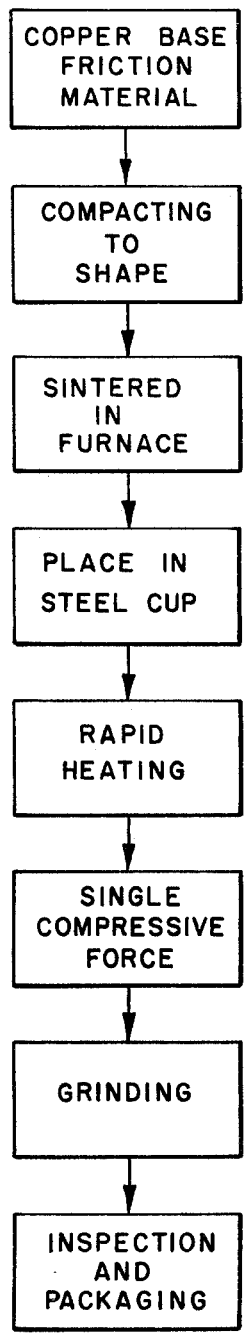
FIG. 2 is a flow diagram of a preferred process for making the friction member of FIG. 1.

FIG. 2 illustrates a flow chart of the process utilized in manufacturing the friction member 10. A typical friction material 14 could be selected from the powder materials listed in Table 1.

TABLE 1

| Ingredient | Range of Percentage of Material | Specific Formula A | Specific Formula B |
|---|---|---|---|
| Copper or Iron | 25-90 | 60 | 70 |
| *Fuseable Materials | 0-30 | 0 | 5 |
| Iron | 0-25 | 10 | 0 |
| Graphite | 5-40 | 10 | 15 |
| Nickel | 0-10 | 0 | 3 |
| **Friction Producers | 10-30 | 17 | 5 |
| ***Friction Modifiers | 0-10 | 3 | 2 |
| Total | | 100 | 100 |

*Zinc, Bismuth, Lead, Tin and other materials with a relatively low melting point which alloy the ingredients together during sintering.
**Mullite, Kyanite, Silica, and other materials to produce coefficient friction.
***Molybdenum, Barium Sulfate, Antimony, Molybdenum Disulfate, and other materials which prevent excessive wear, noise, and stabilize the coefficient friction of the resulting friction material.

Specific formulae A and B are illustrative of copper base friction compositions which could be used in friction member 10. However, in some instances iron powder is substituted for the copper. Once a desired formula is selected, the powders are mixed together and poured into a mold, shown as step 1 in FIG. 2. A compaction force is exerted on the powder to preform the material into a solid member with a shape corresponding to the reinforcing cup 12, shown as step 2 in FIG. 2. The preformed friction material is then transferred to a furnace and heated to a temperature up to 1900° F. in a period of up to 90 minutes to sinter the copper base friction composition, shown as step 3 in FIG. 2. During sintering, the materials coalesce and adhere to each other in an integrated mass and are hereafter referred to as a sintered friction material. Since the oven is only required to heat the copper base friction composition, greater quality control can be achieved. In addition, a saving in fuel in the operation of the oven is also achieved.

The sintered friction material is now removed from the furnace and allowed to cool. Since sintered friction material is relatively stable, it can be stored for a period of time before being attached to a reinforcing cup. Thus, the sintering process is a completely independent step in the manufacture of the friction member 10.

The reinforcing cups 12 are usually made of steel which is then coated with copper. A preformed sintered friction material is placed in the reinforcing cup to form an assembly, as shown by step 4 in FIG. 2. Thereafter, the assembly is placed in an electrical induction heater or oven. An inert atmosphere, made up of nitrogen and hydrogen, is introduced into the induction heater or oven to suspend assembly in an oxygen-free atmosphere. The electrical induction heater is actuated to heat the entire assembly to about 1700° F. in less than 5 minutes, shown in step 5 in FIG. 2. The heated assembly is removed from the induction heater and placed in a press. The heated assembly is struck with a single compressive force to establish the desired density in the friction material, shown as step 6 in FIG. 2. Because of the temperature of the sintered friction material and cup 12, a weld 16 is formed along the entire interface between the friction material 14 and the retainer cup 12.

Upon removal from the press, the friction member is allowed to cool and thereafter, as shown in step 7 in FIG. 2, the surface is ground to a desired thickness for a particular operation before inspecting and packaging, shown as step 8 in FIG. 2.

To evaluate the overall effectiveness of this process, friction members were produced from formula A and formula B in the following specific steps.

Compositions of formula A and B were placed in individual molds and struck with a single compressive force of about 40,000 psi to produce a preformed friction article having a shape corresponding to the retaining cup. Several sample pieces of the preformed friction articles made according to formula A and B were placed in a furnace at the same time and heated to 1900° F. in about 60 minutes to sinter the friction material. The sintered friction material was then removed from the oven and allowed to cool to ambient temperature.

Each of the sintered friction articles were then matched with a copper clad steel retaining cup and sequentially placed in an electrical induction heater. An inert atmosphere was introduced into the induction heater and the induction heater actuated. A first set of 5 samples for each formula were heated to about 1450° F. in about 3 minutes. Thereafter, additional sets of samples were heated at 50° F. intervals until a temperature of 1650° F. was reached. When a sample reached a desired temperature, it was removed from the induction heater and placed in a press. An initial sample of each set was struck with a single compressive blow of 6,666 psi to produce a desired density in the friction member. The compressive force of the press was increased at intervals of 3,333 psi until 20,000 psi was applied to a final sample in each set. From these samples it was determined that a desired density could be controlled by changing either the temperature or the pressure at which the densification takes place.

In order to determine the strength of the weld, a typical shear test was performed on a variety of such test samples. In the shear test, forces were applied to the friction material and the reinforcing cup until a failure occurred. Whenever a failure occurred in the friction material, a strong weld was created between the friction material and the reinforcing cup. From our test we were able to conclude that as long as the temperature of the assembly was above 1400° F. and a pressure above 7,000 psi was applied, a strong metallurgical weld could be achieved.

We claim:
1. A method of attaching a sintered friction material to a retainer comprising the steps of:
   placing the sintered friction material on said retainer;
   heating said sintered friction material and said retainer to a uniform temperature between 1400° to 1650° F; and
   striking said heated sintered friction material and said retainer with a single compressive force between 7000 and 20,000 psi to compact said friction material to a predetermined density and to bond said sintered friction material to said retainer.
2. The method, as recited in claim 1, further including the step of:
   locating said sintered friction material and said retainer in an inert atmosphere during said uniform heating.
3. The method, as recited in claim 2, further including the step of:
   transferring said heated sintered material and retainer from said inert environment to a hydraulic press when said predetermined temperature is reached.
4. A method of manufacturing a brake pad comprising the steps of:
   filling a mold with a copper base friction material;
   densifying the copper base friction material in said mold;
   placing the densified copper base friction material in a furnace;
   raising the temperature in the furnace to sinter said copper base friction material;
   removing the sintered copper base friction material from said furnace;
   placing the sintered copper base friction material on a retainer;
   heating said sintered copper base friction material and retainer until a uniform temperature between 1400° to 1900° F is reached; and
   striking said heated retainer and sintered copper base friction material with a single compressive force to compact said copper base friction material to a predetermined density and to metallurgically bond said copper base friction material to said retainer.
5. The method, as recited in claim 4, further including the step of:
   filling said furnace with an inert atmosphere during the sintering of said copper base friction material.
6. The method, as recited in claim 5, further including the step of:
   grinding said copper base friction material to establish a desired thickness.

* * * * *